United States Patent

Habermeier et al.

[15] 3,679,681

[45] July 25, 1972

[54] DIGLYCIDYL ETHERS

[72] Inventors: Juergen Habermeier, Allschwil; Hans Batzer, Arlesheim; Daniel Porret, Binningen, all of Switzerland

[73] Assignee: Ciba-Geigy AG, Basel, Switzerland

[22] Filed: Jan. 7, 1970

[21] Appl. No.: 1,289

[30] Foreign Application Priority Data

Jan. 24, 1969 Switzerland ..........................1104/69

[52] U.S. Cl. ...................260/256.4 C, 260/309.5, 260/2 EP, 260/18, 260/47, 260/830, 260/831, 260/834
[51] Int. Cl. ....................................C07d 49/32, C07d 51/42
[58] Field of Search.................260/260, 257, 309.5, 256.4 C

[56] References Cited

UNITED STATES PATENTS 3,542,803   11/1970   Porret.................................260/309.5

*Primary Examiner*—Alex Mazel
*Assistant Examiner*—Anne Marie T. Tighe
*Attorney*—Harry Goldsmith, Joseph G. Kolodny and Mario A. Monaco

[57] ABSTRACT

New diglycidyl ethers of binuclear, five-membered or six-membered, unsubstituted or substituted, oxyalkylated N-hetero-cyclic compounds, which contain two NH groups in the molecule, by reaction of binuclear, five-membered or six-membered, unsubstituted or substituted, N-heterocyclic compounds, such as bis-(hydantoin) or bis-(dihydrouracil) compounds, for example 1,1'-methylene-bis-(5,5-dimethylhydantoin), bis-(5,5-dimethylhydantoinyl-3)-methane or 1,1'-methylene-bis-(5,6-dihydrouracil) with ethylene oxide, for example ethylene oxide or propylene oxide, to give the corresponding monohydroxy or dihydroxy compounds, and subsequent glycidylation of the OH groups or of the OH group and the NH group to give the corresponding glycidyl ethers. The new diglycidyl ethers can be crosslinked by means the usual curing agents for epoxides to form insoluble and infusible products with good mechanical properties.

9 Claims, No Drawings

DIGLYCIDYL ETHERS

The subject of the present invention is new diglycidyl ethers of general formula:

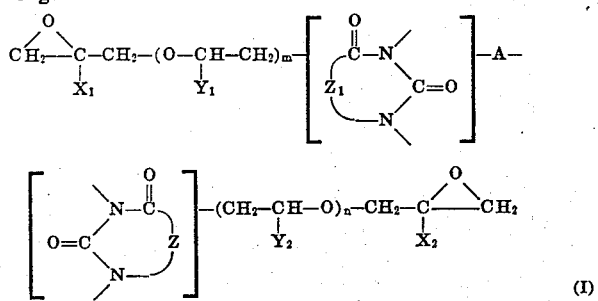

wherein $Z_1$ and $Z_2$ independently of one another each denote a nitrogen-free divalent residue which is required for completing a five-membered or six-membered, unsubstituted or substituted, heterocyclic ring, A represents a divalent aliphatic, cycloaliphatic or araliphatic residue, and in particular preferably an alkylene residue or an alkylene residue which is interrupted by oxygen atoms, $X_1$, $X_2$, $Y_1$ and $Y_2$ each denote a hydrogen atom or a methyl group and m and n each represent an integer having a value of 0 to 30, preferably of 0 to 4, with the sum of $m$ and $n$ having to be at least 1.

The residues Z in the formula (I) preferably consist only of carbon and hydrogen or of carbon, hydrogen and oxygen. Each can for example be one of the residues of formulas

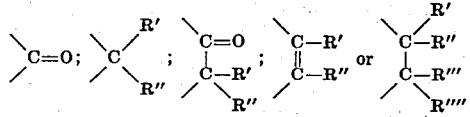

wherein R', R'', R''' and R'''' independently of one another each can denote a hydrogen atom or, for example, an alkyl residue, an alkenyl residue, a cycloalkyl residue or an optionally substituted phenyl residue.

The new diglycidyl ethers of formula (I) can be manufactured by reacting compounds of general formula

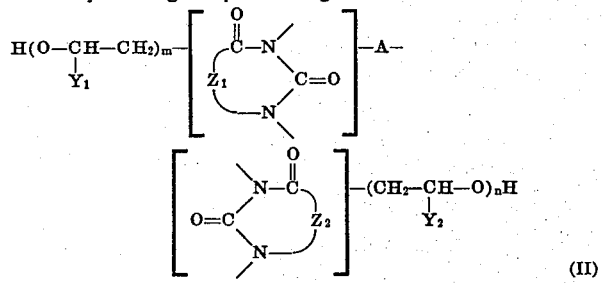

wherein $Z_1$, $Z_2$, A, $Y_1$, $Y_2$, m and n have the same significance as in formula (I), in a single stage or in several stages, with an epihalogenohydrin or β-methylepihalogenohydrin, such as for example epichlorhydrin, β-methylepichlorhydrin or epibromhydrin, in a manner which is in itself known.

In the single-stage process the reaction of epihalogenohydrin with a compound of formula (II) takes place in the presence of alkali, for which sodium or potassium hydroxide are preferably used. In this single-stage process the epichlorhydrin which is reacted in accordance with the process can be replaced completely or partially by dichlorhydrin, which is transiently converted to epichlorhydrin under the process conditions and if alkali is adequately added, and then reacts as such with the monoalcohol or dialcohol of formula (II). In the preferentially used two-stage process the compound of formula (II) is, in a first stage, added to an epihalogenohydrin in the presence of acid or basic catalysts to give the halogenohydrin ether and subsequently the latter is dehydrohalogenated in a second stage, by means of alkalis such as potassium or sodium hydroxide, to give the glycidyl ether.

Suitable acid catalysts in the two-stage process are particularly Lewis acids, such as for example $AlCl_3$, $SbCl_5$, $SnCl_4$, $FeCl_3$, $ZnCl_2$, $BF_3$ and their complexes with organic compounds.

The reaction can also be accelerated by adding other suitable catalysts, for example alkali hydroxides, such as sodium hydroxide, and alkali halides, such as lithium chloride, potassium chloride, and sodium chloride, bromide and fluoride.

Preferably, the new glycidyl ethers according to the invention, of formula (I), are manufactured by reacting an epihalogenohydrin, preferably epichlorhydrin, in the presence of a basic catalyst such as preferably a tertiary amine or a quaternary ammonium base or a quaternary ammonium salt, with a compound of formula (II) and treating the resulting product containing halogenohydrin groups with agents which split off hydrogen halide.

Suitable basic catalysts for the addition of epichlorhydrin are above all tertiary amines such as triethylamine, tri-n-propylamine, benzyldimethylamine, N,N-dimethylaniline and triethanolamine; quaternary ammonium bases, such as benzyltrimethylammonium hydroxide; quaternary ammonium salts, such as tetramethylammonium chloride, tetraethylammonium chloride, benzyltrimethylammonium chloride, benzyltrimethylammonium acetate and methyltriethylammonium chloride; further, ion exchange resins with tertiary or quaternary amino groups; further, trialkylhydrazonium salts, such as trimethylhydrazonium iodide.

Other suitable catalysts are, furthermore, also low molecular thioethers and sulphonium salts, for example compounds which can, with the epihalogenohydrins, be converted into thioethers or sulphonium compounds, such as hydrogen sulphide, sodium sulphide or mercaptans.

As such thioethers or sulphonium salts there may be mentioned: diethyl-sulphide, β-hydroxyethyl-ethyl-sulphide, β-hydroxypropyl-ethyl-sulphide, ω-hydroxytetramethylene-ethylsulphide, thiodiglycol, mono-β-cyanethyl-thioglycolether, dibenzyl-sulphide, benzyl-ethyl-sulphide, benzyl-butyl-sulphide, trimethylsulphonium iodide, tris(β-hydroxyethyl)-sulphonium chloride, dibenzylmethylsulphonium bromide, 2,3-epoxypropylmethylethylsulphonium iodide, dodecylmethyl-sulphide and dithiane.

Strong alkalis such as anhydrous sodium hydroxide or aqueous sodium hydroxide solution are as a rule used for the dehydrohalogenation; however, other alkaline reagents such as potassium hydroxide, barium hydroxide, calcium hydroxide, sodium carbonate or potassium carbonate can also be used.

The dehydrohalogenation can, in turn, be carried out in several stages. Thus it is possible first to carry out a treatment with solid sodium or potassium hydroxide at elevated temperature and then, after distilling off the excess epihalogenohydrin, to heat in an inert solvent with an excess of concentrated alkali hydroxide solution, for example 50 percent strength sodium hydroxide solution.

Possible epihalogenohydrins are epibromhydrin, β-methylepichlorhydrin and above all epichlorhydrin. Good yields are obtained if an excess of epichlorhydrin, and in particular preferably 4 to 40 mols of epichlorhydrin, are used per hydroxyl group or NH group. During the first reaction stage, before the addition of alkali, a partial epoxidation of the bis-chlorhydrin-ether of a compound of formula (II) already occurs. The epichlorhydrin, which acts as a hydrogen chloride acceptor, is thereby partially converted into glycerine-dichlorhydrin. This is again regenerated to epichlorhydrin on treatment with alkali.

The monoalcohols and dialcohols of general formula (II) have hitherto not yet been described in the literature and are obtained in a known manner by reacting binuclear N-heterocyclic compounds of general formula

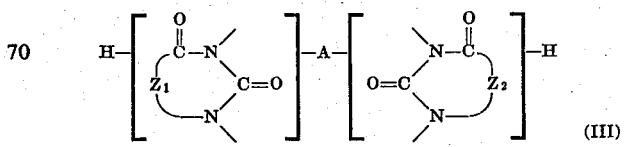

wherein $Z_1$, $Z_2$ and A have the same significance as in formula (I), with alkene oxides viz. ethene oxide (ethylene oxide) and propene oxide (propylene oxide), in the presence of a suitable catalyst.

The addition of an alkene oxide to one or both NH groups of the binuclear N-heterocyclic compounds of formula (III) can be carried out both in the presence of acid catalysts and of alkaline catalysts, with a slight excess over the equivalent of the alkylene oxide being employed per equivalent NH group of the binuclear N-heterocyclic compound of formula (III).

Preferably, however, alkaline catalysts, such as tetraethylammonium chloride or tertiary amines, are used in the manufacture of monoalcohols and dialcohols of formula (II) in which the sum of $m$ and $n$ is 1 or 2. However, alkali metal halides such as lithium chloride or sodium chloride can also be successfully used for this addition reaction; it also takes place without catalysts.

In the manufacture of dialcohols of formula (II) in which the sum of $m$ and $n$ is greater than 2, it is preferable to start from the simple dialcohols of formula (II) in which $m$ and $n$ are each 1, and to add further alkene oxide to both OH groups of this compound in the presence of acid catalysts.

The binuclear N-heterocyclic compounds of formula (III) used for the manufacture of the new alkene oxide addition products of formula (II) are above all bis-(hydantoin) compounds or bis-(dihydrouracil) compounds in which the two N-heterocyclic rings are linked to one another via an alkylene bridge, for example a methylene group, which is bonded to an endocyclic nitrogen atom of each of the heterocyclic rings in question.

A first category of such bis-(hydantoin) compounds corresponds to the general formula

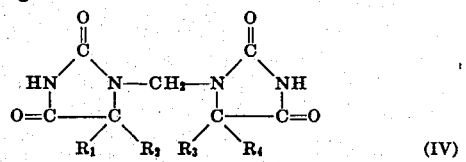

(IV)

wherein $R_1$, $R_2$, $R_3$ and $R_4$ each denote a hydrogen atom or a lower alkyl residue with 1 to 4 carbon atoms, or wherein $R_1$ and $R_2$, and/or $R_3$ and $R_4$, together form a tetramethylene or pentamethylene residue.

There may for example be mentioned 1,1'-methylene-bis-(5,5-dimethyl-hydantoin), 1,1'-methylene-bis-(5-methyl-5-ethyl-hydantoin), 1,1'-methylene-bis-(5-propyl-hydantoin) and 1,1'-methylene-bis-(5-isopropyl-hydantoin).

A further category of such bis-(hydantoin) compounds corresponds to the general formula

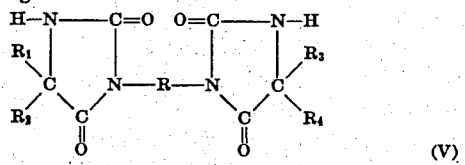

(V)

wherein R is an aliphatic, cycloaliphatic or araliphatic residue, especially an alkyl residue or an alkylene residue interrupted by oxygen atoms, and R, $R_2$, $R_3$ and $R_4$ each denote a hydrogen atom or a lower alkyl residue with one to four carbon atoms, or wherein $R_1$ and $R_2$ and/or $R_3$ and $R_4$ together form a tetramethylene or pentamethylene residue. Bis-(5,5-dimethylhydantoinyl-3)-methane, 1,2-bis-(5',5'-dimethyl-hydantoinyl-3')-ethane, 1,4-bis-(5',5'-dimethyl-hydantoinyl-3')-butane, 1,6-bis-(5',5'-dimethyl-hydantoinyl-3')-hexane, 1,12-bis-(5',5'-dimethyl-hydantoinyl-3')-dodecane and β,β'-bis-(5',5'-dimethylhydantoinyl-3')-diethyl-ether may be mentioned.

A preferentially used category of bis-(dihydrouracil) compounds corresponds to the general formula

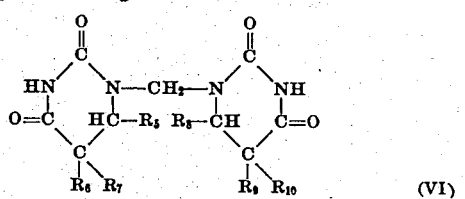

(VI)

wherein $R_5$, $R_6$, $R_7$, $R_8$, $R_9$ and $R_{10}$ independently of one another each denote a hydrogen atom or a lower alkyl residue with one to four carbon atoms.

1,1'-Methylene-bis-(5,6-dihydrouracil), 1,1'-methylene-bis-(-(6-methyl-5,6-dihydrouracil) and 1,1'-methylene-bis-(5,5-dimethyl-5,6-dihydrouracil) may be mentioned.

The new diglycidyl ethers according to the invention, of formula (I), react with the usual curing agents for polyepoxide compounds and can therefore be crosslinked or cured by the addition of such curing agents, analogously to other polyfunctional epoxide compounds or epoxide resins. Possible curing agents of this kind are basic or acid compounds.

As suitable curing agents there may for example be mentioned: amines or amides, such as aliphatic, cycloaliphatic or aromatic, primary, secondary and tertiary amines, for example monoethanolamine, ethylenediamine, hexamethylenediamine, trimethylhexamethylenediamine, diethylenetriamine, triethylenetetramine, tetraethylenepentamine, N,N-dimethylpropylenediamine-1,3, N,N-diethylpropylenediamine-1,3, bis-(4-amino-3-methyl-cyclohexyl)-methane, 3,5,5-trimethyl-3-(aminomethyl)-cyclohexylamine ("isophorone-diamine"), Mannich bases such as 2,4,6-tris-(dimethylaminomethyl-phenol; m-phenylene-diamine, p-phenylenediamine, bis-(4-aminophenyl)-methane, bis-(4-aminophenyl)-sulphone, m-xylylenediamine; N-(2-aminoethyl)-piperazine; adducts of acrylonitrile or monoepoxides, such as ethylene oxide or propylene oxide to polyalkylenepolyamines, such as diethylenetriamine or triethylenetetramine; adducts of polyamines such as diethylenetriamine or triethylenetetramine, in excess, and polyepoxides such as diomethane-polyglycidyl-ethers; ketimines, for example from acetone or methyl ethyl ketone and bis(p-aminophenyl)-methane; adducts of monophenols or polyphenols and polyamines; polyamides, especially those from aliphatic polyamines, such as diethylenetriamine or triethylenetetramine, and dimerized or trimerized unsaturated fatty acids, such as dimerized linseed oil fatty acid ("VERSAMID"); polymeric polysulphides ("THIOKOL"); dicyandiamide, aniline-formaldehyde resins; polyhydric phenols, for example resorcinol, 2,2-bis-(4-hydroxyphenyl)-propane or phenolformaldehyde resins; boron trifluoride and its complexes with organic compounds, such as $BF_3$-ether complexes and $BF_3$-amine complexes, for example $BF_3$-monoethylamine complex; acetoacetanilide-$BF_3$ complex; phosphoric acid; triphenylphosphite; polybasic carboxylic acids and their anhydrides, for example phthalic anhydride, $\Delta^4$-tetrahydrophthalic anhydride, hexahydrophthalic anhydride, 4-methylhexahydrophthalic anhydride, 3,6-endomethylene-$\Delta^4$ tetrahydrophthalic anhydride, methyl-3,6-endomethylene-$\Delta^4$-tetrahydrophthalic anhydride (= methylnadicanhydride), 3,4,5,6,7,7-hexachlor-3,6-endomethylene-$\Delta^4$-tetrahydrophthalic anhydride, succinic anhydride, adipic anhydride, azelaic anhydride, sebacic anhydride, maleic anhydride, dodecenylsuccinic anhydride; pyromellitic dianhydride or mixtures of such anhydrides.

Cure accelerators can furthermore be employed during curing; when using polyamides, dicyandiamide, polymeric polysulphides or polycarboxylic acid anhydrides as curing agents, suitable accelerators are for example tertiary amines, their salts or quaternary ammonium compounds, for example 2,4,6-tris-(dimethylaminomethyl)-phenol, benzyldimethylamine, 2-ethyl-4-methyl-imidazole, 4-aminopyridine, and triamylammonium phenolate; furthermore, alkali metal alcoholates, such as for example sodium hexanetriolate. Monophenols or polyphenols, such as phenol or diomethane, salicylic acid or thiocyanates can for example be used as accelerators when curing with an amine.

The term "curing" as used here, denotes the conversion of the above diepoxides into insoluble and infusible, cross-linked products, and in particular as a rule with simultaneous shaping to give shaped articles, such as castings, pressings or laminates and the like, or to give "two-dimensional structures" such as coatings, coverings, lacquer films or adhesive bonds.

Depending on the choice of the curing agent, the curing can be carried out at room temperature (18°–25° C) or at elevated temperature (for example 50–180° C).

The curing can, if desired, also be carried out in two stages, by first prematurely stopping the curing reaction and/or carrying out the first stage at only moderately elevated temperature, whereby a precondensate which is still fusible and soluble (a so-called "B-stage") is obtained from the epoxide component and the curing agent component. Such a precondensate can for example serve for the manufacture of "prepregs," compression moulding compositions or sintering powders.

A further object of the present invention are therefore also curable mixtures which are suitable for the manufacture of shaped articles, including two-dimensional structures, and which contain the diglycidyl ethers according to the invention, optionally together with other diepoxide or polyepoxide compounds, and furthermore curing agents for epoxide resins, such as polyamines or polycarboxylic acid anhydrides.

The diepoxides according to the invention or their mixtures with other polyepoxide compounds and/or curing agents can furthermore be mixed, in any stage before curing, with customary modifiers such as extenders, fillers and reinforcing agents, pigments, dyestuffs, organic solvents, plasticizers, flow control agents, agents for conferring thixotropy, flame-proofing substances and mould release agents.

As extenders, reinforcing agents, fillers and pigments which can be employed in the curable mixtures according to the invention there may for example be mentioned: coal tar, bitumen, textile fibers, glass fibers, asbestos fibers, boron fibers, carbon fibers, cellulose, polyethylene powder, polypropylene powder; quartz powder; mineral silicates such as mica, asbestos powder and slate powder; kaolin, aluminum oxide trihydrate, chalk powder, gypsum, antimony trioxide, bentones, silica aerogel ("AEROSIL"), lithopone, barytes, titanium dioxide, carbon black, graphite, oxide pigments, such as iron oxide, or metal powders, such as aluminum powder or iron powder.

Suitable organic solvents for the modification of the curable mixtures are for example toluene, xylene, n-propanol, butyl acetate, acetone, methyl ethyl ketone, diacetone-alcohol, ethylene glycol monomethyl ether, monoethyl ether and monobutyl ether.

Dibutyl, dioctyl and dinonyl phthalate, tricresyl phosphate, trixylenyl phosphate, and also polypropylene glycols can for example be employed as plasticizers for modifying the curable mixtures.

Silicones, cellulose acetobutyrate, polyvinyl butyral, waxes, stearates and the like (which in part are also employed as mould release agents) can for example be added as flow control agents when employing the curable mixtures, especially in surface protection.

Particularly for use in the lacquer field, the diepoxide compounds can furthermore be partially esterified in a known manner with carboxylic acids, such as especially higher unsaturated fatty acids. It is furthermore possible to add other curable synthetic resins, for example phenoplastics or aminoplastics, to such lacquer resin formulations.

The manufacture of the curable mixtures according to the invention can be carried out in the usual manner with the aid of known mixing equipment (stirrers, kneaders, rolls and the like).

The curable epoxide resin mixtures according to the invention are above all employed in the fields of surface protection, the electrical industry, laminating processes and the building industry. They can be used, in a formulation suited in each case to the special end use, in the unfilled or filled state, and optionally in the form of solutions or emulsions, as paints, lacquers, compression molding compositions, sintering powders, dipping resins, casting resins, injection moulding formulations, impregnating resins and binders, adhesives, as tool resins, laminating resins, sealing and filling compositions, floor covering compositions and binders for mineral aggregates.

In the examples which follow, unless otherwise stated, parts denote parts by weight and percentages denote percentages by weight. The relationship of parts by volume and parts by weight is as of the millimeter to the gram.

For determination of the mechanical and electrical properties of the curable mixtures described in the examples which follow, sheets of 92 × 41 × 12 mm were manufactured for determining the flexural strength, deflection, impact strength and water absorption. The test specimens (60 × 10 × 4 mm) for determining the water absorption and for the flexural and impact test (VSM 77,103 and VSM 77,105 respectively) were machined from these sheets.

Test specimens of dimensions 120 × 15 × 10 mm where in each case cast for determining the heat distortion point according to Martens (DIN 53,458).

Sheets of dimensions 120 × 120 × 4 mm were cast for testing the arcing resistance and tracking resistance (VDE 0303).

MANUFACTURE OF THE STARTING SUBSTANCES

Example A

A mixture of 529 g of ethylene oxide (12 mols) and 1 liter of dimethylformamide, cooled to 5° C, is added to a mixture of 1341.5 g of 1,1'-methylene-bis-(5,5-dimethylhydantoin) [5 mols], 3 liters of dimethylformamide and 12.5 g of lithium chloride at room temperature. The mixture is heated to 75° C over the course of 1 hour and 45 minutes with good stirring, and the reaction then starts to become weakly exothermic. The reaction temperature is kept for 3½ hours at 75°–78° C and the mixture is subsequently stirred for a further 2 hours at 100°–105° C. The hot solution is filtered off, neutralized with 20 percent strength sulphuric acid and subjected to a vacuum distillation. The dimethylformamide is largely distilled off at 100° C bath temperature and 15 mm Hg and a crystalline residue is obtained. This crude product was recrystallized from a three-fold amount of dioxan, and dried. 1,462 g (corresponding to 81.4 percent of theory) of pure 1,1'-methylene-bis-(3-β-hydroxyethyl-5,5-dimethylhydantoin) of melting point 165°–165.7° C are obtained in the form of colorless glistening crystals. Elementary analysis shows:

| found | calculated |
|---|---|
| 50.68 % C | 50.55 % C |
| 6.69 % H | 6.79 % H |
| 15.58 % N | 15.72 % N |

The molecular weight was determined to be 359 (theory: 356.4) by vapor pressure osmometry, and analysis by gel permeation chromatography shows that a substance of uniform molecular weight is present. The IR-(infrared) spectrum shows, through the absence of the NH-amide absorptions and the C—O—C absorption at 9.0–9.3 $\mu$ and through the presence of the OH absorptions at 2.95–3.0 $\mu$ that the desired substance has been produced. The H-NMR (nuclear magnetic resonance) spectrum shows, through the presence of the following protons, that the structural formula given below is applicable:

12 protons (CH$_3$) at      $\delta$ = 1.38
8 protons (CH$_2$) at      $\delta$ = 3.49
2 protons (-OH) at      $\delta$ = 4.68
2 protons (N-CH$_2$-N) at      $\delta$ = 4.95

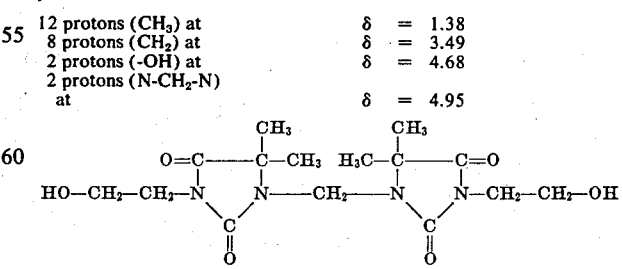

Example B 3.0 ml of 48 percent strength boron trifluoride-diethyl etherate solution (in diethyl ether) are added at 65° C to a solution of 178.0 g of 1,1'-methylene-bis-(3-β-hydroxyethyl-5,5-dimethylhydantoin) [0.5 mol] (manufactured according to Example A) in 700 ml of dioxan. Thereafter 44.8 liters of gaseous ethylene oxide (2 mols) are passed into the solution over the course of 4 hours while stirring; the amount of ethylene oxide introduced is controlled wit the aid of a gas flow meter (Rotameter). The reaction is weakly exothermic and the reaction mixture becomes warmed to 73° C.

After completion of the introduction of the ethylene oxide, the mixture is stirred for a further 3 hours at 75° C and is then adjusted to pH 7 with finely powdered potassium carbonate, and filtered. The clear filtrate is concentrated on a rotary evaporator and is then dried to constant weight (100° C, 0.1 mm Hg).

265 g (100 percent of theory) of an ochre-colored viscous resin are obtained, the H—NMR (nuclear magnetic resonance) spectrum of which shows the presence of 40 protons; the molecular weight is 505 ± 25 (theory 532).

This shows that mainly the following product has been produced:

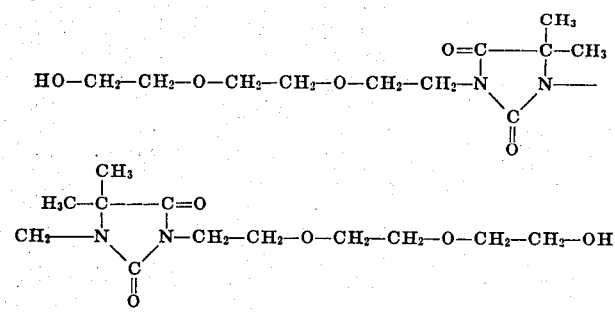

Example C

A mixture of 268.3 g of 1,1'-methylene-bis-(5,5-dimethyl-hydantoin) [1 mol], 600 ml of dimethylformamide and 2.11 g of lithium chloride is stirred at 60° C. 134.0 g of propene oxide (2.3 mols) are slowly added dropwise to this mixture over the course of 1 hour and 45 minutes. Thereafter the mixture is heated to 100° C over the course of 1.5 hours and stirred at 100° C for a further 2 hours. The hot reaction mixture is now filtered and cooled to room temperature, neutralized with 20 percent strength sulphuric acid and concentrated to dryness on a rotary evaporator. The crude product is recrystallized from ethanol. 327.0 g of pure 1,1'-methylene-bis-(3-$\beta$-hydroxy-n-propyl-5,5-dimethylhydantoin) [85.3 percent of theory] of melting point 131°–133° C are obtained. Microanalysis shows 14.50 percent N (calculated, 14.58 percent N); analysis by gel permeation chromatography shows that the substance is of uniform molecular weight. The N-NMR (nuclear magnetic resonance) spectrum and the IR (infrared) spectrum can be reconciled with the following structure:

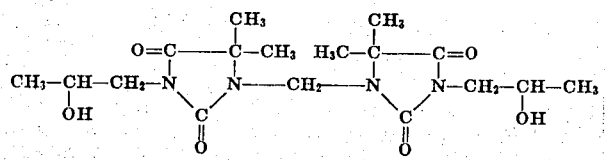

Example D 88.9 g of 1,1'-methylene-bis-(5,5-dimethyl-5,6-dihydrouracil) and 0.63 g of lithium chloride in 300 ml of dimethylformamide are reacted with a solution of 29.4 g of ethylene oxide in 150 ml of dimethylformamide according to the method described in Example A. after working up according to Example A, a highly viscous practically colorless reaction product is obtained in 100 percent yield (115 g). The product can be purified by reprecipitation from methanol/water. The H-NMR (nuclear magnetic resonance) spectrum shows the presence of 28 protons and agrees with the structure given below. The molecular weight is determined by vapor pressure osmometry to be 382 (theory 384.3).

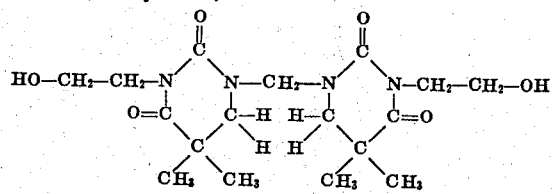

Example E

A solution of 88.1 g of ethylene oxide (2 mols) in 300 ml of dimethylformamide is reacted, according to the method described in Example A, with a mixture of 155.2 g of 1,4-bis-(5',5'-dimethylhydantoinyl-3')-butane (0.5 mol), 2.12 g of lithium chloride and 700 ml of dimethylformamide, but the reaction time is here 24 hours. The mixture is worked up according to Example A and 199 g of crystalline crude 1,4-bis-(1'-$\beta$'-hydroxyethyl-5',5'-dimethylhydantoinyl-3')-butane (100 percent of theory) are obtained. The crude product is purified by recrystallization from methanol. After drying at 90° C/150 mm Hg, 144.2 g of pure product of melting point 173°–175°C are obtained. Elementary analysis shows:

| found | calculated |
|---|---|
| 54.07 % C | 54.26 % C |
| 7.64 % H | 7.59 % H |
| 14.03 % N | 14.08 % N |

The determination of the molecular weight by vapor pressure osmometry shows = 398 (theory = 398.4). Analysis by gel permeation chromatography shows that the product has a uniform molecular weight. IR (infrared) and N-NMR (nuclear magnetic resonance) spectra prove the following structure:

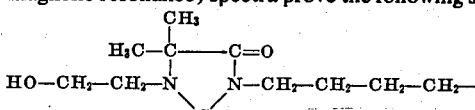

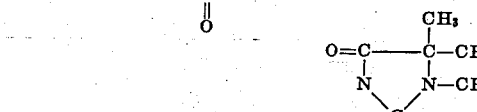

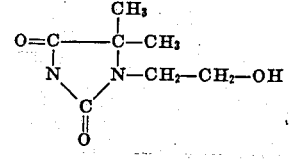

Example F

A solution of 88.1 g of ethylene oxide (2 mols) in 300 ml of dimethylformamide is mixed, in accordance with the method described in Example A, with a mixture of 169.5 g of 1,6-bis-(5',5'-dimethylhydantoinyl-3')-hexane (0.5 mol), 2.12 g of lithium chloride (10 mol percent relative to the hydantoin derivative) and 700 ml of dimethylformamide and warmed to 75° C over the course of 1 hour. The mixture is stirred for 17 hours at 75° C and then for a further 5 hours at 100° C. The reaction mixture is filtered, adjusted to pH=7 with 20 percent strength sulphuric acid and evaporated to dryness on a rotary evaporator at 100° C/15 mm Hg. 214 g of crude product (100 percent of theory) are obtained in the form of a brown viscous oil which crystallizes out on standing. For purification, the crude product is very intensively stirred with 1 liter of diethyl ether, filtered off from the brown solution and dried. 189 g (= 88.8 percent of theory) of 1,6-bis-(1', $\beta$'-hydroxyethyl-5',5'-dimethylhydantoinyl-3')-hexane are obtained in the form of fine almost colorless crystals of melting point 89°–92°C. The H-NMR (nuclear magnetic resonance) spectrum shows the presence of 30 protons, which agrees with theory. The IR spectrum shows the following absorptions:

2.86 $\mu$ (s) [OH]
5.67 $\mu$ (s) [C = O]
5.87 $\mu$ (ss) [C = O]

furthermore:

7.60$\mu$; 7.85 $\mu$; 8.06 $\mu$; 8.53 $\mu$; 8.85 $\mu$; 9.05 $\mu$; 9.46 $\mu$; 10.22 $\mu$; 11.12 $\mu$; 11.95 $\mu$; 13.02 $\mu$; 13.40 $\mu$; 14.18 $\mu$.

Accordingly, the product has the following structure:

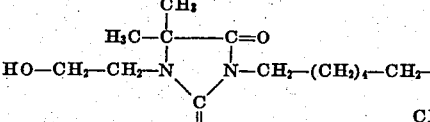

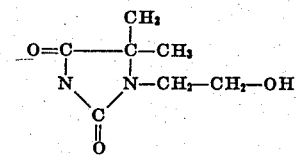

Example G 116.2 g of propene oxide are added dropwise over the course of 6 hours, while stirring, to a solution of 169.5 g of 1,6-bis-(5',5'-dimethylhydantoinyl-3')-hexane, 1.06 g of lithium chloride and 1 liter of dimethylformamide warmed to 75° C. Thereafter the mixture is stirred for a further 5 hours at 105° and is subsequently cooled to room temperature and neutralized with concentrated sulphuric acid (about 18 drops are required). The mixture is filtered and the clear colorless filtrate is concentrated to constant weight at 100° C/15 mm Hg. 202 g of a clear pale yellow very viscous melt (89% of theory) are obtained. The H-NMR (nuclear magnetic resonance) spectrum shows inter alia through the presence of three different signals for methyl protons

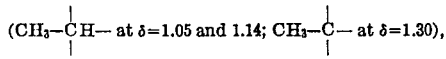

that essentially the following substance, 1,6-bis-(1',β'-hydroxy-n-propyl-5',5'-dimethylhydantoinyl-3')-hexane, is present.

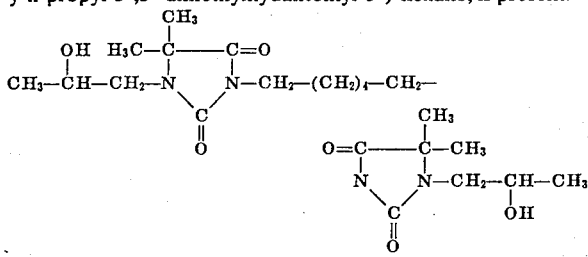

Example H 123.9 g of bis-(5,5-dimethylhydantoinyl-3)-tetrachloro-p-xylylene (0.25 mol), 1.5 l of dimethylformamide and 0.3 g of lithium chloride are stirred at 50° C. 58.1 g of propene oxide (1.0 mol) are slowly added dropwise over the course of 2½ hours. A clear pale yellow solution is produced which is brought to 88°–90° C over the course of 2½ hours. After 8 hours stirring at 88°–90° C the solution is cooled to room temperature and filtered. The filtrate is concentrated to dryness on a rotary evaporator and is subsequently dried to constant weight at 80° C bath temperature under 0.1 mm Hg. 138.7 g of a whitish-yellow crystalline mass (92 percent of theory) are obtained. The substance melts at 272°–275° C. The infrared spectrum (Nujol paste) shows, through the presence of the absorption at 3,500 cm⁻¹, that the structural element C—OH is present.

Example J 73.0 g of 1,1'-methylene-bis-(3-β-hydroxyethyl-5,5-dimethylhydantoin) [0.205 mol] (manufactured according to Example A) are dissolved in 500 ml of dioxane and stirred at 75° C. 3.5 ml of 47 percent strength boron fluoride-diethyl etherate solution in ether are added and the introduction of a vigorous stream of ethylene oxide is immediately started. The apparatus is provided with a low temperature condenser so that no ethylene oxide can escape. The ethylene oxide mixture is metered into the apparatus via a gas flow meter (Rotameter). The reaction is immediately exothermic. The heating bath is removed so that the apparatus is cooled by the surrounding air. The strength of the stream of ethylene oxide is made such that the temperature of the mix is 72°–77° C. After 3 hours the supply of ethylene oxide is terminated, the mixture is cooled to room temperature, and 15 ml of 30 percent strength sodium hydroxide solution and 200 ml of water are stirred in. The whole is filtered and the solution is concentrated on a rotary evaporator at 70° C under a slight vacuum. Thereafter the residue is dried at 90° C bath temperature/0.1 mm Hg.

175.0 g of a liquid, colorless, clear substance are obtained. The weight increase attributable to the ethylene oxide is, accordingly, 102.0 g (2.32 mols), that is to say 5.65 molecules of ethylene oxide have reacted per OH group of the starting substance. The infrared spectrum shows, in addition to the absorptions known from 1,1'-methylene-bis-(3-β-hydroxyethyl-5,5-dimethylhydantoin), a very intense C—O—C absorption at 1,124 cm⁻¹. The proton-magnetic resonance spectrum (60 Mc H-NMR, recorded in CDCl₃ with tetramethylsilane as an internal standard) shows the following four signals

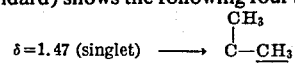

$\delta = 3.05$ (singlet) $\longrightarrow$ —CH₂—O$\underline{H}$ $\delta = 3.65$ (multiplet) $\longrightarrow$ N—$\underline{CH_2}$—$\underline{CH_2}$—O—$\underline{CH_2}$—$\underline{CH_2}$—O $\delta = 5.08$ (singlet) $\longrightarrow$ N—$\underline{CH_2}$—N At the same time the integration ratio of the methylene group signal to the signals at $\delta \approx 3.65$ shows that per N-atom ≈ 6.7 mols of ethylene oxide have been added on. This agrees well with the gravimetrically determined ratios. Accordingly the substance has the following average structure:

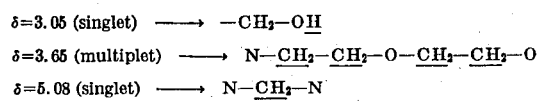

X ≈ 6.7 (average value)

(CH₂—CH₂—O)ₓH

Example K

A mixture of 148.2 g of 1,1'-methylene-bis-(5-isopropylhydantoin) (0.5 mol), 300 ml of dimethylformamide and 1.3 g of lithium chloride is stirred at 50° C. 81.4 g of propene oxide (1.4 mol) are added dropwise over the course of 2 hours while stirring. Thereafter the mixture is stirred for a further 10 hours at 80° C, and is cooled to room temperature and filtered. The clear colorless solution is concentrated at 60°–80° C on a rotary evaporator under a waterpump vacuum and is subsequently dried to constant weight at 80°–90° C under 0.1 mm Hg. A clear colorless resin (206.3 g) is obtained in 100 percent yield, which on standing gradually solidifies to give colorless crystals. The infrared spectrum shows in addition to the absorptions of the 1,1'-methylene-bis-(5-isopropylhydantoin) skeleton, a relatively intense absorption at 3,490 cm⁻¹, which is attributable to the C—OH group.

The proton-magnetic resonance spectrum (60 Mc H-NMR, recorded in CDCl₃ at 35° C with tetramethylsilane as an internal standard) shows, through the integration ratio of the signals

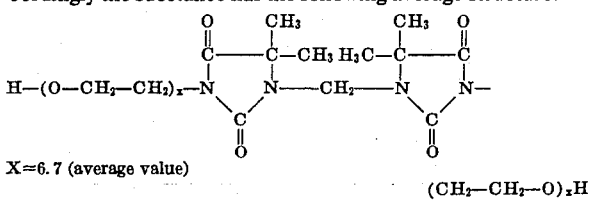

that the addition of propene oxide to the binuclear heterocyclic system in the ratio of 2:1 has taken place quantitatively.

Example L

A solution of 88.9 g of 1,1'-methylene-bis-(5,5-dimethyl-5,6-dihydrouracil) [0.3 mol] and 0.630 g of lithium chloride in 550 ml of dimethylformamide is stirred at 65° C. 38.4 g of propene oxide (0.66 mol) are slowly added dropwise over the course of 2 hours while stirring. Thereafter the reaction mixture is heated to 100° C over the course of 30 minutes. The mix is then stirred for a further 5 hours at this temperature, and is then filtered and concentrated at 80° C/40 mm Hg; thereafter it is dried to constant weight at 95° C/0.1 mm Hg.

121.1 g of a completely colorless clear, transparent, glass-like viscous substance (97.8 percent of theory) are obtained. The infrared and nuclear resonance spectrum show that the grouping

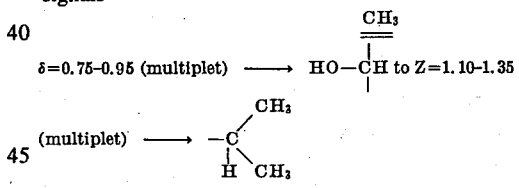

is present and that only traces of the grouping

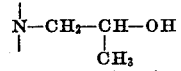

are still present.

MANUFACTURE OF THE GLYCIDYL ETHERS

Example 1

142.2 g of 1,1'-methylene-bis-(3-β-hydroxyethyl-5,5-dimethylhydantoin) [0.4 mol] (manufactured according to Example A), 1.99 g of tetraethylammonium chloride (3 mol percent) and 592.5 g of epichlorhydrin (6.4 mols) are stirred for 3 hours at 90° C. In the course of this the reaction mixture changes to a clear pale yellow solution. It is then cooled to 85° C and 86.4 g of 50 percent strength sodium hydroxide solution (1.08 mols) are added dropwise over the course of 20 minutes, and at the same time the water present in the reaction mixture is continuously removed by azeotropic circulatory distillation and separated off. 55.5 ml of water separate out (theory 57.6 ml). After separating off the water, the hot reaction mixture is separated from the sodium chloride by filtration. The salt which has been separated off is washed with 60 ml of epichlorhydrin and the combined epichlorhydrin solutions are cooled to room temperature and extracted by shaking with 50 ml of water. The organic phase is concentrated on a rotary evaporator at 60° C/15 mm Hg and is subsequently treated at 60° C and 0.1 mm Hg until the last traces of volatile constituents have been removed.

A viscous light yellow resin with an epoxide content of 3.80 equivalents/kg (corresponding to 89 percent of theory) is obtained in 97.6 percent yield (182.8 g). The elementary analysis shows 11.8 percent N (calculated, 11.96 percent N) and a total chlorine content of 1.00 percent. The IR (infrared) analysis shows, through the presence of C—O—C absorptions, that the desired product has been produced. The H-NMR (nuclear magnetic resonance) spectrum shows, through the presence of the following protons:

12 (C-CH₃) protons at    δ = 1.50
2 (N-CH₂-N) protons
 at                      δ = 5.08
18 further protons at    δ = 2.4 – 4.0, that the glycidyl ether resin obtained essentially has the formula given below:

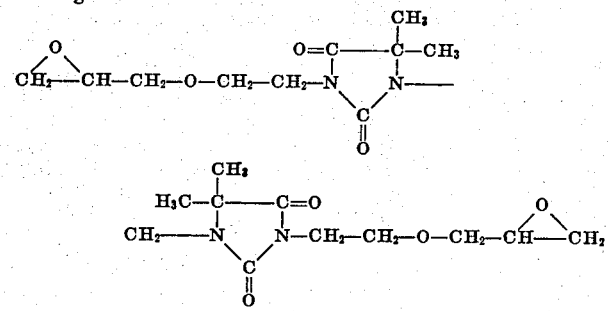

Example 2

A mixture of 130.0 g of 1,1'-methylene-bis-(3-β-hydroxyethyl-5,5-dimethylhydantoin) [manufactured according to Example A], 1.8215 g of tetraethylammonium chloride and 778 g of β-methylepichlorhydrin is stirred for 2 hours at 100° C and then cooled to 85° C. 79.1 g of 50 percent strength sodium hydroxide solution are added dropwise over the course of 25 minutes with continuous removal of water from the circuit, as described in Example 1. The material is worked up in accordance with Example 1 and a viscous, amber-colored β-methylglycidyl ether resin with 3.43 epoxide equivalents/kg (corresponding to 85 percent of theory) and 1.46 percent total chlorine content is obtained in 87.3 percent yield (173.2 g). The H-NMR (nuclear magnetic resonance) spectrum shows inter alia through the presence of methyl protons at δ = 1.18 and methyl protons at δ = 1.38 in the ratio of 1:2, that the resin obtained essentially consists of the di-(β-methylglycidyl ether) of 1,1'-methylene-bis-(3-hydroxyethyl-5,5-dimethylhydantoin). Equally, the IR (infrared) spectrum shows that the diglycidyl ether can essentially be reconciled with the following structure:

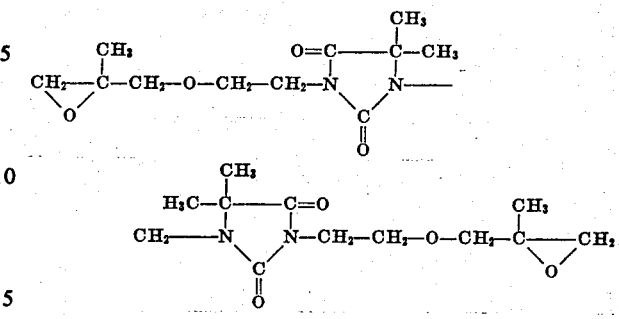

Example 3

99.8 g of 1,4-bis-(1'-β'-hydroxyethyl-5',5'-dimethylhydantoinyl-3')-butane (0.25 mol) [manufactured according to Example E], 1.24 g of tetraethylammonium chloride (2 mol percent) and 463 g of epichlorhydrin (5 mols) are stirred for 2½ hours at 90° C. The mixture is then cooled to 75° C and 52.2 g of 50 percent strength sodium hydroxide solution are added dropwise with good stirring over the course of 30 minutes, with continuous removal of water, as described in Example 1. After working up according to example 1, 114 g of a light yellow viscous resin (89.3 percent of theory) are isolated, with 3.32 epoxide equivalents/kg (85 percent of theory) and a total chlorine content of 1.5 percent. The H-NMR (nuclear magnetic resonance) spectrum shows, through the presence of 38 protons, that the resin essentially consists of the diglycidyl ether of the following formula:

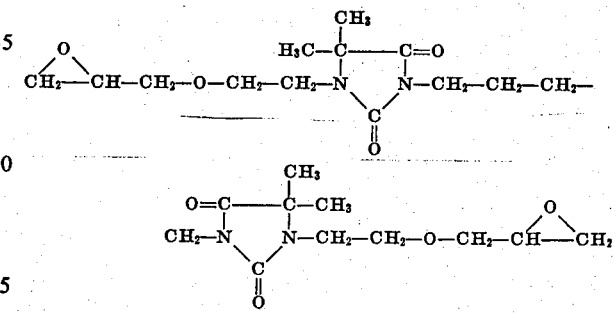

Example 4

A mixture of 133 g of the 1,1'-methylene-bis-(3-β-hydroxyethoxyethoxyethyl-5,5-dimethylhydantoin) [0.25 mol] manufactured according to Example B, 1.24 g of tetraethylammonium chloride (3 mol percent) and 278 g of epichlorhydrin 3 mols) is stirred for one hour at 90° C. 52.0 g of 50 percent strength sodium hydroxide solution are then added dropwise at 60° C over the course of 2 hours with water being continuously separated off as described in Example 1. The working up is carried out according to Example 1 and 161 g (100 percent of theory) of an ochre-colored resin with 3.07 epoxide equivalents/kg (98.8 percent of theory) and 1.2 percent total chlorine content are obtained. The H-NMR (nuclear magnetic resonance) spectrum shows, through proton resonance signals at δ=1.40         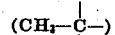

at δ=2.62-3.20    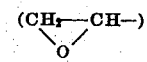

at δ=3.37-3.72    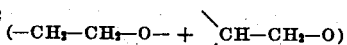

that the resulting resin essentially has the following structure:

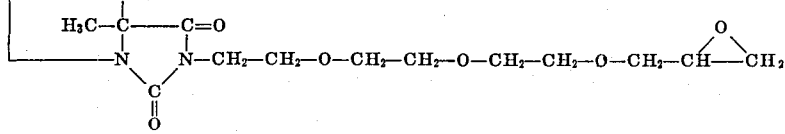

Example 5

A mixture of 134.5 g of 1,1'-methylene-bis-(3-β-hydroxy-n-propyl-5,5-dimethylhydantoin) [0.35 mol] (manufactured according to Example C), 1.740 g of tetraethylammonium chloride (3 mol percent) and 650 g of epichlorhydrin (7 mols) is stirred for 2 hours at 90° C and then cooled to 60° C, and 72.9 g of 50 percent strength sodium hydroxide solution are added dropwise over the course of 120 minutes—as described in Example 1—with continuous removal of water. The mixture is worked up according to Example 1 and a glycidyl ether resin with 3.35 epoxide equivalents per kg is obtained in 89 percent yield, essentially agreeing with the following structural formula:

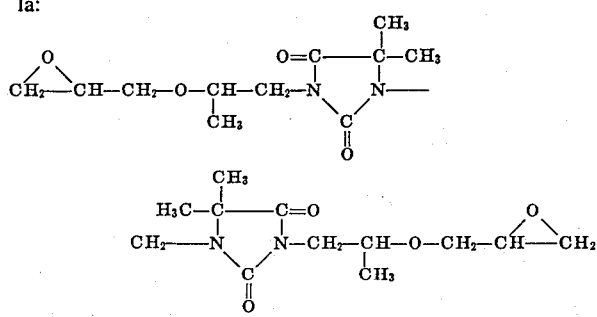

Example 6

A mixture of 134.5 g of 1,1'-methylene-bis-(3-β-hydroxy-n-propyl-5,5-dimethylhydantoin) [0.35 mol] (manufactured according to Example C), 1.740 g of tetraethylammonium chloride and 744 g of β-methylepichlorhydrin is treated exactly as described in Example 5. After working up according to Example 1, a resin with 2.67 epoxide equivalents/kg (70 percent of theory) is obtained in 82 percent yield (150.1 g), which essentially consists of a product having the following structure:

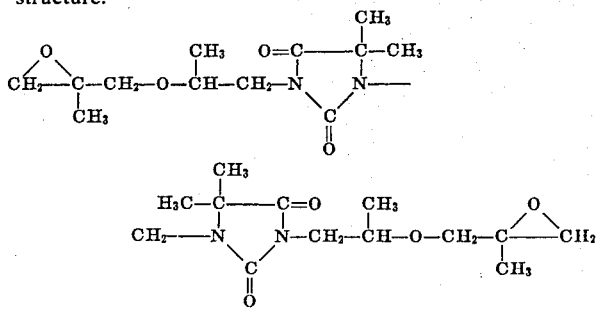

Example 7

87.4 g of the product manufactured according to Example H (1.5 mols) together with 555.0 g of epichlorhydrin (6 mols) and 0.75 g of tetraethylammonium chloride are stirred for 2 hours at 90° C. Thereafter 29.8 g of 50 percent strength sodium hydroxide solution (0.39 mol) are added dropwise over the course of 2 hours with vigorous stirring; at the same time the water present in the reaction mixture is continuously removed by azeotropic circulatory distillation and separated off. The mixture is subsequently cooled to room temperature and freed of the resulting sodium chloride by filtration. The clear pale yellow solution is concentrated on a rotary evaporator at 60° C under a waterpump vacuum and the product is then dried to constant weight at 60° C/0.1 mm Hg.

92.1 g of a light yellow crystalline epoxide resin with 3.11 epoxide equivalents/kg are obtained. The substance melts at 189°–193°C.

Example 8

A mixture of 141.5 g of the dialcohol manufactured according to Example J (0.15 mol), 550.0 g of epichlorhydrin (6 mols) and 0.746 g of tetraethylammonium chloride is stirred 1½ hours at 90° C. 30.0 g of 50 percent strength sodium hydroxide solution (0.375 mol) are then slowly added dropwise over the course of 2 hours with vigorous stirring and at the same time the water present in the reaction mixture is continuously removed by azeotropic circulatory distillation and separated off. After the dropwise addition, azeotropic distillation is continued for a further 10 minutes in order to remove the last remnants of water from the reaction mixture.

Thereafter, the resulting sodium chloride is filtered off whilst the mixture is still warm, and the apparatus and filter residue are rinsed with 200 ml of epichlorhydrin. The combined epichlorhydrin solutions are cooled to room temperature and washed with 50 ml of water to remove the last traces of sodium chloride. The water layer is separated off and the organic phase is distilled on a rotary evaporator at 60° C bath temperature under a slight vacuum. The residue is then treated at 70° C/0.1 mm Hg, until constant weight is reached, in order to remove the last traces of volatile constituents.

146.0 g of a light ochre-colored clear, transparent epoxide resin (92.3 percent of theory) with an epoxide content of 2.07 equivalents/kg (corresponding to 100 percent of theory) are obtained. Elementary analysis shows:

| found | calculated |
|---|---|
| 6.09 % N | 6.16 % N |
| 7.97 % H | 7.98 % H |
| 0.5 % Cl | 0.03 % Cl |

The proton magnetic resonance spectrum (60 Mc H-NMR, recorded in $CDCl_3$ at 35° C with tetramethylsilane as an internal standard) shows the following signals:

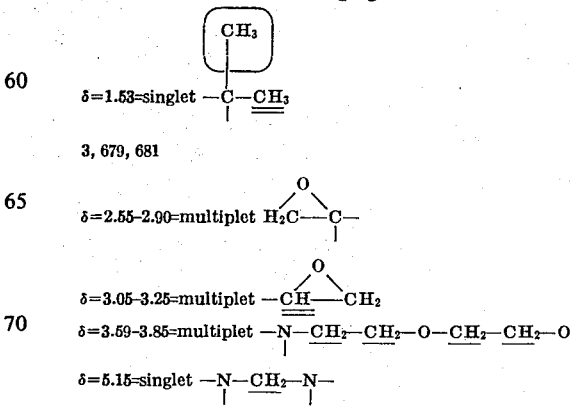

The epoxide content can be determined from the integration ratio of the signals $\delta = 1.53$ to $\delta = 2.55$ to $2.90$. 3.962

protons are found, which is identical with an epoxide content of 99.2 percent of theory. Good agreement with the value obtained by titration with HClO₄ is found. The epoxide resin thus on average corresponds to about the following structure:

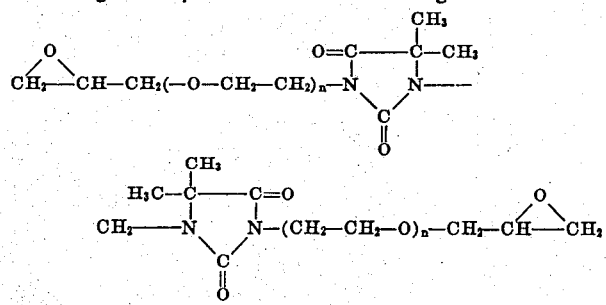

n=6.7 (average value)

Example 9

A mixture of 122 g of the 1,1'-methylene-bis-(3-β-hydroxypropyl-5-isopropylhydantoin) manufactured according to Example K with 740.0 g of epichlorhydrin and 1.49 g of tetraethyl-ammonium chloride is stirred for 2 hours at 90° C. Thereafter dehydrohalogenation is carried out with 62.5 g of 50 percent strength sodium hydroxide solution as described in Example 8.

The reaction product is worked up according to Example 8 and 151 g of a brownish-yellow resin (99.8 percent of theory) are obtained, having an epoxide content of 3.53 epoxide equivalents/kg (92.5 percent of theory). The total chlorine content is 2.0 percent.

Example 10

A solution of 72.9 g of the addition product of propene oxide and 1,1'-methylene-bis-(5,5-dimethyl-5,6-dihydrouracil), manufactured according to Example L, and 0.997 g of tetraethylammonium chloride in 370.0 g of epichlorhydrin was stirred for 2 hours at 90° C. A circulatory distillation is then started at 60° C (vacuum 60–90 mm Hg). 41.6 g of 50 percent strength sodium hydroxide solution are slowly added dropwise over the course of 2 hours with vigorous stirring and at the same time the water present in the reaction medium is continuously removed from the circuit and separated off. After the addition of the sodium hydroxide solution and separation of the water, the resulting sodium chloride is filtered off and the clear solution is extensively concentrated and subsequently dried to constant weight in a high vacuum (60° C/0.1 mm Hg).

A light ochre-colored viscous, clear, transparent epoxide resin with 2.75 epoxide equivalents/kg (corresponding to 72.4 percent of theory) is obtained. The total chlorine content is 4.0 percent.

USE EXAMPLES

Example I

A mixture of 67.5 parts of the glycidyl ether of 1,1'-methylene-bis-(3-β-hydroxyethyl-5,5-dimethylhydantoin) [manufactured according to Example 1] and 33.8 parts of hexahydrophthalic anhydride is mixed at 70° C to give a homogenous liquid, briefly subjected to a vacuum and poured into an aluminum mould prewarmed to 120° C (140 × 40 × 10 mm; wall thickness 0.15 mm). Curing takes place in 4 hours at 120° C and 15 hours at 150° C. The gel time of the mixture at 120° C is about 45 minutes. The casting thus obtained has the following mechanical properties:

| | |
|---|---|
| Flexural strength VSM 77,103 | 13.7 kg/mm² |
| Deflection VSM 77,103 | 8.1 mm |
| Impact strength VSM 77,105 | 11.1 cmkg/cm² |
| Heat distortion point according to Martens DIN 53,458 | 65°C |

Example II

A mixture of 67.4 parts of 1,1'-methylene-bis-[3-β-(β'-methylglycidyloxy)-ethyl-5,5-dimethylhydantoin], manufactured according to Example 2, 29.6 g of phthalic anhydride and 1 g of 2,4,6-tris-(dimethylaminomethyl)-phenol is stirred at 130° C, briefly degassed and poured into an aluminum mould prewarmed to 140° C. Curing takes place in one hour at 140° and and 17 hours at 160°C. The gel time of the mixture at 140° C is about 10 minutes. The clear, transparent, amber-colored moulding thus obtained has the following mechanical properties:

| | |
|---|---|
| Flexural strength VSM77,103 | 11.9 kg/mm² |
| Deflection VSM 77,103 | 2.9 mm |
| Impact strength VSM 77,105 | 7.9 cmkg/cm² |
| Heat distortion point according to Martens DIN 53,458 | 74°C |

Example III

A mixture of 66.2 parts of 1,4-bis-(1'-β'-glycidyloxyethyl-5',5'-dimethylhydantoinyl-3')-butane, manufactured according to Example 3, and 28.8 parts of hexahydrophthalic anhydride is stirred at 65° C to give a homogeneous, clear melt and after brief subjection to a vacuum is poured into an aluminum mold prewarmed to 120° C. The mixture gels in 20 minutes at 120°C. Curing takes place in 4 hours at 120° C and 15 hours at 150° C. The glass-clear moulding thus obtained shows the following mechanical properties:

| | |
|---|---|
| Flexural strength VSM 77,103 | 11.4 kg/mm² |
| | (however no fracture at maximum deflection because of the flexibility !) |
| Deflection VSM 77,103 | >11.4 mm |
| Impact strength VSM 77,105 | 10.4 cmkg/cm² |
| Heat distortion point according to Martens DIN 53,458 | 52°C |

Example IV

A mixture of 75 parts of 1,1'-methylene-bis-(3-β-glycidyloxyethoxyethyl-5,5-dimethylhydantoin), manufactured according to Example 4, and 29 parts of phthalic anhydride is processed at 100° C to give a homogeneous, clear melt and after brief subjection to a vacuum is poured into an aluminum mould prewarmed to 120° C. Curing takes place as described in Example III. A clear, transparent casting having the following properties is obtained:

| | |
|---|---|
| Flexural strength VSM 77,103 | 10.4 kg/mm² |
| | (however no fracture at maximum deflection because of the elasticity of the casting) |
| Deflection VSM 77,103 | >16.4 mm |
| Impact strength VSM 77,105 | 9.6 cmkg/cm² |
| Heat distortion point according to Martens DIN 53,458 | 37°C |

Example V

A mixture of 67 parts of the resin manufactured according to Example 4 and 30 parts of hexahydrophthalic anhydride is processed as described in Example IV to give a casting having the following properties:

| | |
|---|---|
| Impact strength VSM 77,105 | >25.0 kg/cm² |
| Deflection VSM 77,103 | >20 mm |

The test specimen does not break at maximum deflection.

We claim:

1. A diglycidyl ether of formula

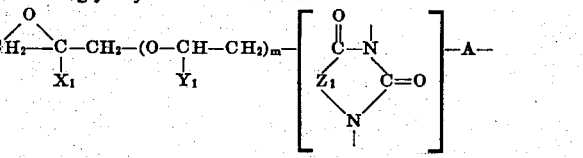

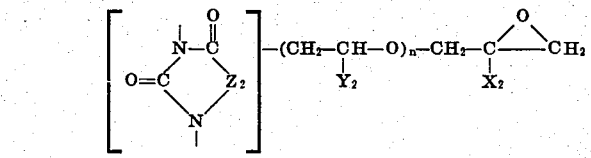

wherein $X_1$, $X_2$, $Y_1$ and $Y_2$ each represents a member selected from the group consisting of a hydrogen atom and a methyl group, A represents $C_{1-12}$ alkylene, diethylene ether or tetrachloro-p-xylylene and $Z_1$ and $Z_2$ each represents a member selected from the group consisting of a divalent residue of formulas

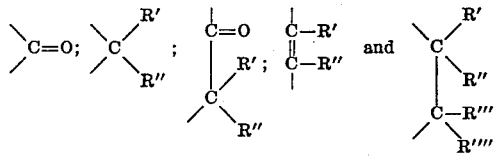

wherein R', R'', R''' and R'''' each is hydrogen or alkyl with 1 to 5 carbon atoms, or when the residue $Z_1$ or $Z_2$ represents the formula

R' and R'' together can also form a tetramethylene or pentamethylene residue, and $m$ and $n$ each represent an integer having a value of 0 to 6.7 (average value), with the sum of $m$ and $n$ having to be at least 1.

2. 1,1'-Methylene-bis-(3-β-glycidyloxyethyl-5,5-dimethyl-hydantoin).

3. 1,1'-Methylene-bis-[3-β-β'-methylglycidyloxy)-ethyl-5,5-dimethylhydantoin].

4. 1,4-Bis-(1'-β'-glycidyloxyethyl-5',5'-dimethylhydantoinyl-3')-butane.

5. 1,1'-Methylene-bis-(3-β-glycidyloxyethoxyethoxyethyl-5,5-dimethylhydantoin).

6. 1,1'-Methylene-bis-(3-β-glycidyloxy-n-propyl-5,5-dimethyl-hydantoin).

7. 1,1'-Methylene-bis-[3-β-(β'-methylglycidyloxy)-n-propyl-5,5-dimethylhydantoin].

8. 1,1'-Methylene-bis-(3-β-glycidyloxy-n-propyl-5isopropyl-hydantoin.

9. 1,1'-Methylene-bis-(3-β-glycidyloxy-n-propyl-5,5-dimethyl-5,6-dihydrouracil).

* * * * *